Aug. 10, 1943.  H. A. PAVITT  2,326,674
INDUCTION HARDENING OF SAW TEETH
Filed July 26, 1940  2 Sheets-Sheet 1
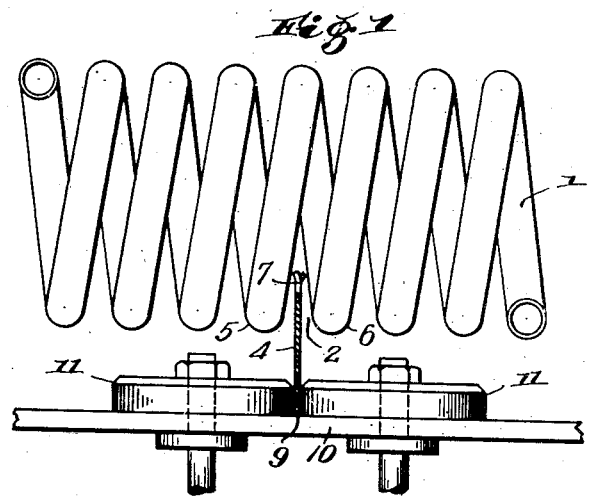
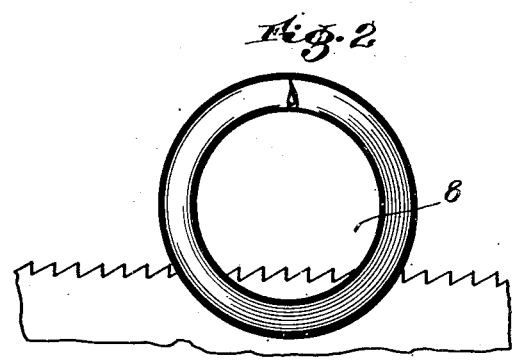
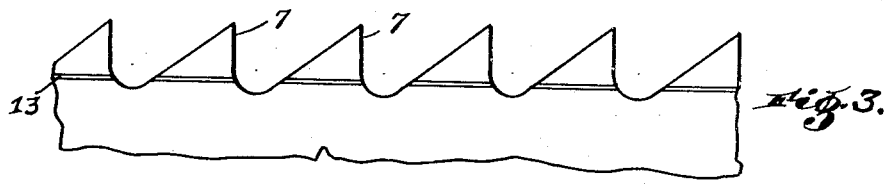
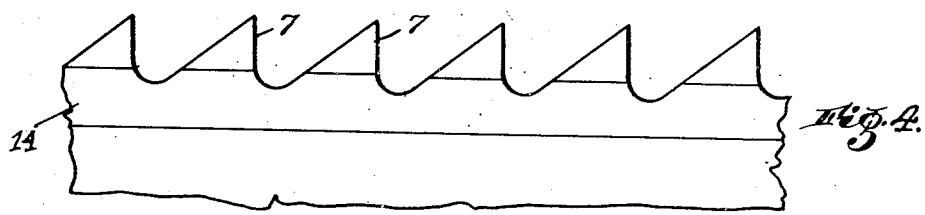
INVENTOR
HARRY A. PAVITT
BY Robert C. Simonds
ATTORNEY Aug. 10, 1943.  H. A. PAVITT  2,326,674
INDUCTION HARDENING OF SAW TEETH
Filed July 26, 1940   2 Sheets-Sheet 2

INVENTOR
HARRY A. PAVITT
BY
Robert W. C. Simonds
ATTORNEY

Patented Aug. 10, 1943

2,326,674

UNITED STATES PATENT OFFICE 2,326,674

INDUCTION HARDENING OF SAW TEETH

Harry A. Pavitt, Fitchburg, Mass., assignor to Simonds Saw and Steel Co., Fitchburg, Mass., a corporation of Massachusetts Application July 26, 1940, Serial No. 347,666

2 Claims. (Cl. 148—21.5)

This invention relates to an improved method of making saw blades, and more particularly to the hardening of hack saw blades composed of high speed tool steel.

In the course of heat-treating such blades it has been the practice to heat them above the critical temperature and hold them at such elevated temperature for a substantial period of time. By heating the steel to above the critical temperature a solid solution of iron and carbon, known as "austenite," is formed, and by holding the steel at such elevated temperature the segregated carbides or carbon components of the steel gradually dissolve in the austenitic matrix. This continued heating has been necessary in order to obtain requisite hardness, but has resulted in the steel losing toughness and becoming brittle.

Thus, in treating such blades according to the prior art it has been necessary to compromise between a heat treatment which produces maximum hardness but with an undesired loss of toughness, and a heat treatment which produces maximum toughness but with a considerable sacrifice of hardness. This compromise is undesirable, for the performance of cutting tools depends not only on the hardness but also on the toughness of the steel. If the steel is too soft, then the tool wears excessively; if the steel is too brittle, then the tool chips and breaks.

I have discovered that when the teeth of a saw are heated so that the carbides or carbon components of the steel are in condition to dissolve in the austenitic matrix as soon as the steel attains the critical temperature, or a slightly higher temperature, a substantially complete solution of the carbides or carbon components of the steel can be obtained without the need for holding the steel at or above the critical temperature for any substantial length of time. More specifically, I have discovered that when the teeth of the saw are rapidly heated by a high frequency induced current, passed through the teeth, it is unnecessary to hold the steel at or above the critical temperature for any substantial length of time in order to produce a steel substantially free from undissolved carbides.

I have found that when high speed tool steel is heated in this manner, and cooled without being held at or above the critical temperature for any substantial length of time such as would produce undesirable grain growth, the resulting steel exhibits, under microscopic examination, a substantial or complete absence of undissolved carbides, while at the same time undesired grain growth is prevented and the grain size in the structure of the steel is kept unusually small. In this way, extreme hardness is obtained, and yet the steel does not suffer a loss of toughness or become brittle.

While I do not wish to be limited to any particular theory, I believe that the ability of the carbides or carbon components to dissolve in the austenitic matrix practically as soon as the steel reaches the critical temperature is due to the effect of the current in heating the carbides or carbon components of the steel more rapidly than the metallic matrix is heated. That is to say, the carbides or carbon components have a greater resistance to the current, and to the rapid reversal of the current when induced by a high-frequency alternating current, than has the metallic matrix. Thus, the carbides or carbon components of the steel reach the temperature required for developing in them sufficient mobility for dissolving in or being absorbed in the austenitic matrix as soon as this austenitic matrix is formed. Moreover, by passing such a current through the steel, the particles at the center of the section which is heated are subjected to the same heating as are the particles at the outside, as distinguished from the type of heating in which the heat is applied to the outside of the steel and in which the heat is conducted toward the center of the steel relatively slowly.

Other features, objects and advantages of the invention will be pointed out or become apparent in connection with certain specific examples which are set forth by way of illustration. The invention has been developed in connection with hacksaw blades and will be illustrated by reference to such blades merely by way of example.

In describing the specific examples reference will be had to the accompanying drawings wherein:

Fig. 1 is a side elevation of one type of apparatus for heating the cutting edge of a saw blade;

Fig. 2 is an end view of the heating coil and saw blade shown in Fig. 1;

Fig. 3 is a diagrammatic side view representing a saw in which only the teeth have been hardened;

Fig. 4 is a diagrammatic side view representing a saw in which the teeth, the gullets and a portion of the blade have been heat treated;

Figure 5:
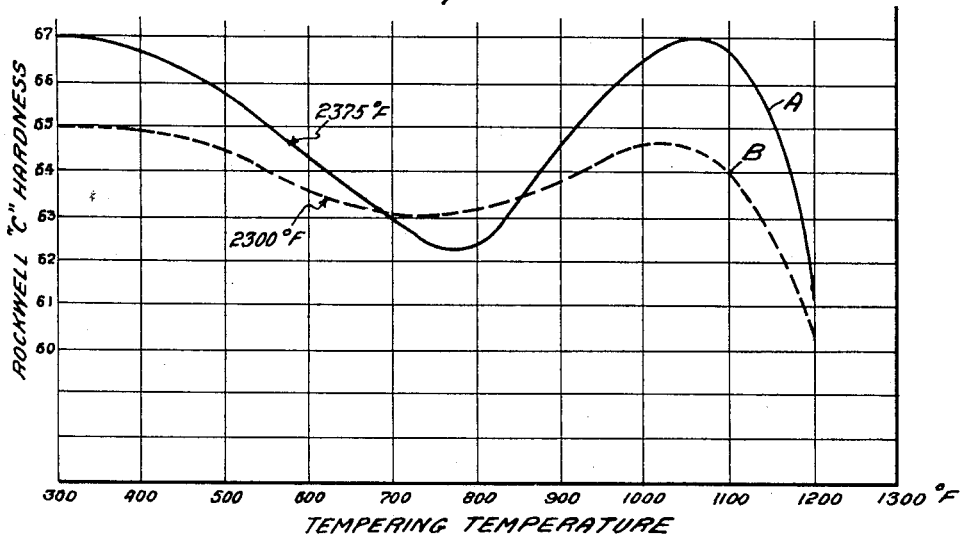
Fig. 5 is a graph showing the effect of tempering on high-speed tool steels hardened, respectively, in accordance with the invention and in accordance with the prior art.

Referring to the drawings, there is shown in Figs. 1 and 2 an induction coil 1 made of hollow copper tubing and having spaces 2 between the convolutions of the coil. An alternating current may be applied to the coil in any convenient manner, as will be understood by those skilled in the art, and a cooling liquid is circulated through the coil to prevent overheating. Means are provided for feeding a saw blade 4 so that its cutting edge 7 passes between adjacent convolutions 5, 6 of the induction coil and through field 8 of the coil. Such means may include, for example, a table 10 provided with feed rolls 11 rotated in opposite directions by any convenient mechanism (not shown). The back 9 of the blade 4 rests on the table and is fed forward by the feed rolls 11. The teeth 7 of the blade pass between the convolutions of the induction coil at a height where the induced current is utilized to best advantage. The extent to which the blade lies between the convolutions of the induction coil will depend upon the zone of the blade which is to be hardened. In some cases it is desired to harden only the teeth 7 of the blades, and not the gullets, while in other cases it may be desirable to harden or partially harden the gullets. For this purpose, the height of the table may be varied. A blade with the teeth only hardened is shown in Fig. 3. In this blade there is a rather sharp line of demarcation 13 between the hardened and unhardened portions of the blade. A blade with the teeth hardened and the gullets partially hardened is shown in Fig. 4. In this case, there is a rather wide zone 14 of medium hardness between the teeth and the blade proper. Such hardening can be readily controlled by subjecting the blade, or the zone of the blade which is to be hardened, to the area in the induction coil where there is more or less induced current.

I have found that excellent results are obtained by treating high-speed tool steels in accordance with the invention. One such high-speed tool steel has the following analysis:

EXAMPLE I

| | Usual range |
|---|---|
| Carbon | .75% (0.65% to 1.00%) |
| Tungsten | 18.00% (16% to 19%) |
| Chromium | 4.00% (3% to 5%) |
| Vanadium | 1.50% (0.5% to 3.0%) |
| Iron containing the usual deoxidizers such as silicon and manganese and the usual impurities | Balance |
| | 100% |

Figure 6:
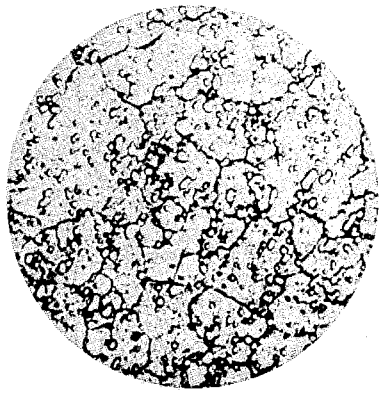
Fig. 6 is a photomicrograph of a section of steel hardened in a conventional manner, magnification X1000.
Figure 7:
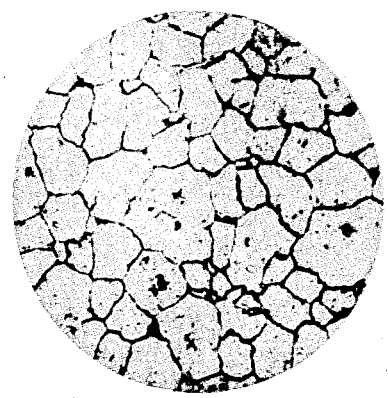
Fig. 7 is a photomicrograph of a section of steel of the same analysis hardened according to the invention, magnification X1000.

By rapidly heating a hacksaw blade made of high-speed steel to about 2375° F. in the apparatus described, and then cooling it without holding it at this temperature for any substantial length of time, a steel can be produced which is free from undissolved carbides and which shows no appreciable increase in grain size. This is shown by a comparison between the two photomicrographs, Figs. 6 and 7. Fig. 6 shows a steel heated according to the prevailing practice, i. e., soaked at the critical temperature for a number of minutes, and then cooled. Fig. 7 shows a steel of the same analysis heated to 2375° F. by induction heating and then cooled without being held for any substantial time at said elevated temperature. It will be noted that whereas both of these steels show a A. S. T. M. grain size of about 7½ (15 grains intercepted in 5 inches at a magnification of 1000 diameters), the steel made according to prior practice shows a large amount of undissolved carbides, whereas the steel treated according to the present invention is substantially free from undissolved carbides. That is to say, in order to obtain a small grain size according to prior practice it has been necessary to sacrifice carbide solubility, with the result that such tools have possessed relatively poor wear resistance. This disadvantage is obviated by the present invention.

As an indication of specific satisfactory conditions, I have found that when a blade of the above analysis, .065 inch thick, is fed through the coil at a rate of about ¼ of an inch per second, with a power input of 6 kilowatts and a frequency of about 250,000 cycles per second, each inch of length of the blade will be heated to 2375° F. in about 2½ seconds, or at an average rate in the order of 950° per second. It will be understood, however, that the rate of feed and power input may be adjusted depending upon the thickness of the blade. It will also be understood that overheating is to be avoided, but that the rate of feed should not be excessive, so that time is allowed for heating the steel throughout, to critical temperature.

After the blades have been withdrawn from the induction coil, they are promptly cooled below the critical temperature to prevent undesired grain growth. High-speed tool steels may be air-cooled or quenched in water or oil.

In order to observe the exact temperature of the steel during the heating an optical pyrometer may be employed. While I prefer to use a high-frequency current, in the order of magnitude mentioned and possibly up to 500,000 cycles per second, no precise frequency is essential to obtaining good results. If desired, the apparatus may be enclosed within an inert atmosphere or liquid, although this precaution appears to be unnecessary. The temperature to which the steel is heated depends upon the analysis of the particular steel. In the case of high-speed tool steels I prefer to heat these steels to between 2375° F. and 2400° F., and in some cases as high as 2425° F. It will be noted that this temperature is slightly higher than that used in the prior art (2300° F.-2350° F.). This higher temperature is permissible since the steel is not held at such temperature for any substantial length of time.

A special advantage of the invention in the hardening of high-speed tool steels lies in their ability to reach a secondary peak hardness during the usual tempering operation which follows the treatment described. This advantage is illustrated in Fig. 5, in which curve A shows the hardness obtainable by tempering such steel which has been heat treated according to the invention. At approximately 1050° F. this steel attains a secondary peak hardness as great as it had before the tempering. Curve B shows the effect of the tempering of steel which has been heat treated according to prior practice, and indicates that the previous hardness is not restored at any temperature used in the tempering operation.

The invention may be applied to various high-speed tool steels containing substantial proportions of one or more of the elements tungsten, molybdenum, chromium, or vanadium, with or without the addition of cobalt. Accordingly, when the term "high-speed tool steel" is used herein it intends a steel containing at least one of these elements in amount in the order of 3 to 25% of the steel. Merely by way of example, there is set forth the following analysis of another representative high-speed tool steel:

EXAMPLE II

|  | Usual range |  |
|---|---|---|
| Carbon | .75% | (0.65% to 1.00%) |
| Molybdenum | 8.00% | (7% to 9%) |
| Chromium | 4.00% | (3% to 5%) |
| Vanadium | 1.50% | (0.5% to 3.0%) |

Iron containing the usual deoxidizers such as silicon and manganese and the usual impurities _____ Balance

100%

The rapid heating of high speed tool steel in the manner described, by means of high-frequency alternating current, produces a remarkable result in that the carbides or carbon components of the tool steel are rendered, due to increased atomic mobility, soluble and diffusible in the steel matrix practically as soon as the steel reaches the critical temperature and before substantial grain growth occurs. Hence, the desired hardness can be produced without substantial increase in the grain size of the steel, and the grain size, in a steel of given hardness, can be readily controlled by limiting the time the steel is held at high temperature. This can be readily accomplished by designing the apparatus so that, if desired, the tool can be held at or above critical temperature for a predetermined time after it has reached this temperature. Thus, in the case of steels of certain analysis it may be desirable to hold these steels momentarily at elevated temperature in order to develop maximum hardness with only a small grain growth. The heating can be readily varied for steels of different analyses by adjusting the rate of feed or by adjusting the power in the induction coil. By thus controlling the heating in accordance with the invention it is possible to produce saws the teeth of which are substantially free from undissolved carbides, without substantial increase in grain size due to hardening.

Still another advantage incident to the use of high-frequency induced current is the ability to zone harden a section of the saw, thus reducing shattering of the teeth. Also the internal and external portions of the article are heated uniformly. That is to say, every small portion of the steel in a given zone is subjected to the same heating, while the carbide atoms or molecules within each such portion are heated more rapidly than the adjacent matrix, by reason of the relatively high resistance of the carbides. The internal heating of the steel by induced current, as distinguished from external heating, thus results in applying more heat to the carbon components than to the metallic components, in contrast to external heating in which the metallic components conduct heat better than the carbon components.

Hacksaw blades have been produced, in accordance with the invention, having markedly increased wear resistance or cutting life together with sufficient toughness so that even less breakage occurs than in the use of previously known blades having considerably less cutting ability. As already indicated, however, the invention is not limited to hacksaw blades.

The terms and expressions which have been employed are used as terms of description and not of limitation, and there is no intention, in the use of such terms and expressions, of excluding any equivalents of the features shown and described, or portions thereof, but it is recognized that various modifications are possible within the scope of the invention claimed.

What I claim is:

1. Method of hardening the teeth of a steel saw blade composed of "high speed tool steel", which comprises passing a high frequency induced current through the teeth of the blade to heat all particles of the teeth, both on the surface and in the interior thereof, to critical temperature without similarly heating other portions of the blade, and thereupon cooling the teeth to a temperature substantially below the critical temperature before substantial grain growth occurs; instead of either hardening the entire blade or merely surface hardening the teeth.

2. Method of hardening the teeth of a steel saw blade composed of "high speed tool steel," which comprises passing a high frequency induced current through the teeth of the blade so that all the particles of the teeth, both on the surface and in the interior thereof, are heated to the critical temperature of approximately 2375° F. without similarly heating other portions of the blade, controlling the frequency and magnitude of the induced current so that substantially all of the carbides in the teeth are in condition to dissolve in the austenitic matrix practically as soon as the steel reaches the critical temperature, and thereupon cooling the teeth to a temperature substantially below the critical temperature before substantial grain growth occurs; instead of either hardening the entire blade or merely surface hardening the teeth.

HARRY A. PAVITT.